United States Patent
van Druten et al.

(10) Patent No.: US 9,890,818 B2
(45) Date of Patent: Feb. 13, 2018

(54) CLUTCH AND/OR BRAKE MODULE

(71) Applicant: DTI Group B.V., Eindhoven (NL)

(72) Inventors: Roël Marie van Druten, Eindhoven (NL); Bas Gerard Vroemen, Eindhoven (NL); Alexander Franciscus Anita Serrarens, Waalre (NL)

(73) Assignee: DTI Group, B.V., Eindhoven (NL)

( * ) Notice: Subject to any disclaimer, the term of this patent is extended or adjusted under 35 U.S.C. 154(b) by 0 days.

(21) Appl. No.: 14/170,097

(22) Filed: Jan. 31, 2014

(65) Prior Publication Data

US 2014/0166428 A1 Jun. 19, 2014

(30) Foreign Application Priority Data

Dec. 3, 2012 (NL) .................................... 2009927
Dec. 7, 2012 (NL) .................................... 2009944
Dec. 11, 2012 (NL) .................................... 2009959

(51) Int. Cl.
*F16D 13/72* (2006.01)
*F16D 13/70* (2006.01)
(Continued)

(52) U.S. Cl.
CPC ............ *F16D 13/72* (2013.01); *F16D 13/70* (2013.01); *F16D 25/123* (2013.01); *F16D 55/32* (2013.01);
(Continued)

(58) Field of Classification Search
CPC .... F16D 13/72; F16D 25/123; F16D 2300/02; F16D 2300/0212; F16D 2055/0095;
(Continued)

(56) References Cited

U.S. PATENT DOCUMENTS

| | | | |
|---|---|---|---|
| 2,699,850 A | 1/1955 | Rakos | |
| 2,893,524 A | 7/1959 | Ferrier | |
| 4,011,930 A * | 3/1977 | Coons et al. | ............ 192/113.36 |
| 6,129,191 A | 10/2000 | Kummer et al. | |
| 2008/0282824 A1* | 11/2008 | Van Druten | ............ F16H 3/006 74/411.5 |
| 2010/0018789 A1 | 1/2010 | Oba et al. | |
| 2011/0174103 A1* | 7/2011 | Kirchner | ................. F16D 21/06 74/325 |

(Continued)

FOREIGN PATENT DOCUMENTS

| | | |
|---|---|---|
| CH | 363861 A | 8/1962 |
| CN | 1281105 A | 1/2001 |
| CN | 2729415 Y | 9/2005 |
| CN | 201206601 Y | 3/2009 |

(Continued)

OTHER PUBLICATIONS

Apr. 19, 2017—Chinese Office Action and Search Report and Translation—App. No. 201410078979.4.
Jun. 6, 2016—European Search Report—EP App No. 14153363.8.

*Primary Examiner* — Huan Le
(74) *Attorney, Agent, or Firm* — Banner & Witcoff, Ltd.

(57) ABSTRACT

A clutch and/or brake module has a heat sink which is attached to a transmission housing for the purpose of discharging heat. The brake module further has a brake disc, which is connected to a rotational member formed by a shaft (schematically indicated by a center line). The brake disc is provided on one side with a lining and faces with this side towards the heat sink. The brake is a dry brake and is not lubricated. The brake module further has an actuation system (cylinder with piston movable therein, schematically indicated by an arrow) which can exert an axial pressing force directly on the brake disc. The brake disc is located axially between the heat sink and the actuation system. The cooling plate is secured to a transmission housing, a part of which is schematically shown.

5 Claims, 3 Drawing Sheets

(51) Int. Cl.
*F16D 25/12* (2006.01)
*F16D 55/32* (2006.01)
*F16D 55/36* (2006.01)
*F16D 65/18* (2006.01)
*F16D 65/84* (2006.01)
*F16D 55/00* (2006.01)
*F16D 65/02* (2006.01)

(52) U.S. Cl.
CPC ........... *F16D 55/36* (2013.01); *F16D 65/186* (2013.01); *F16D 65/84* (2013.01); *F16D 2055/0058* (2013.01); *F16D 2065/1324* (2013.01); *F16D 2300/021* (2013.01)

(58) Field of Classification Search
CPC ...... F16D 65/128; F16D 65/78; F16D 65/827; F16D 65/847; F16D 2065/1328; F16D 2065/1332
See application file for complete search history.

(56) References Cited

U.S. PATENT DOCUMENTS

2011/0281681 A1* 11/2011 Van Druten .......... F16D 25/083
  475/329
2012/0255826 A1  10/2012 Tanaka et al.

FOREIGN PATENT DOCUMENTS

DE      1233671 B    2/1967
EP      2529969 A1  12/2012
FR      1055608 A    2/1954
JP    2008126883 A    6/2008

* cited by examiner

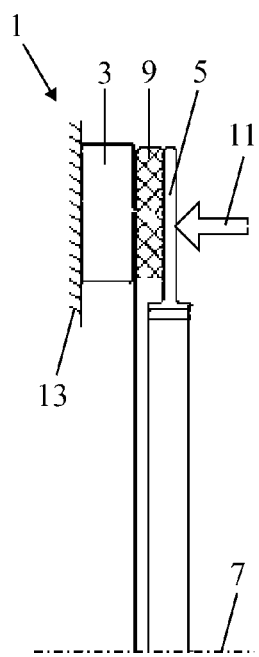
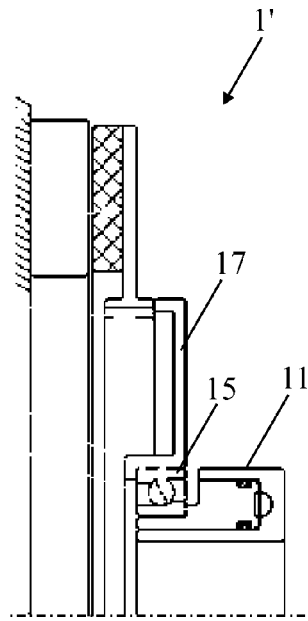
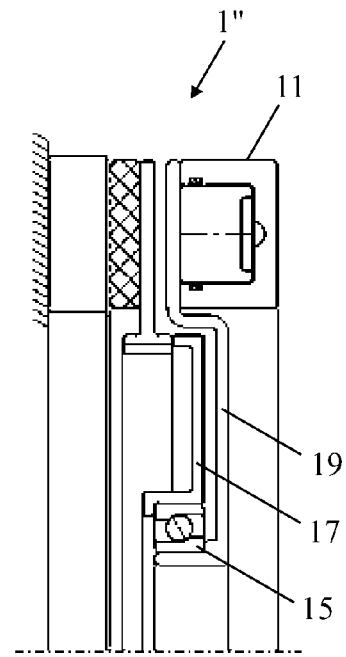
FIG. 1　　FIG. 2　　FIG. 3
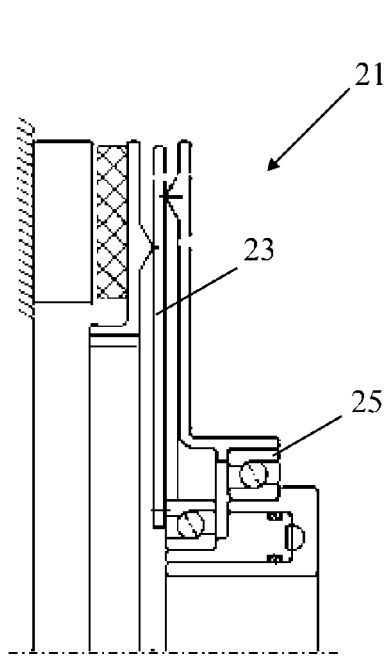
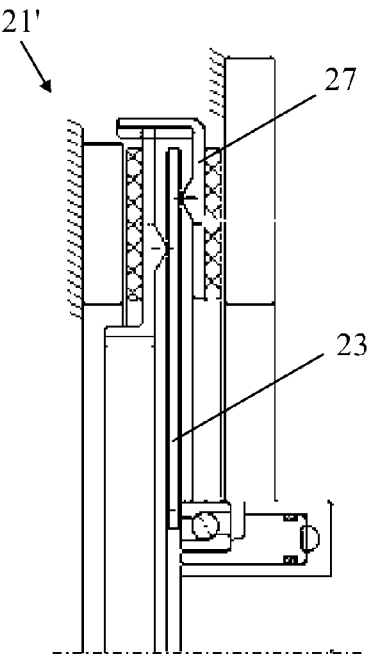
FIG. 4　　FIG. 5

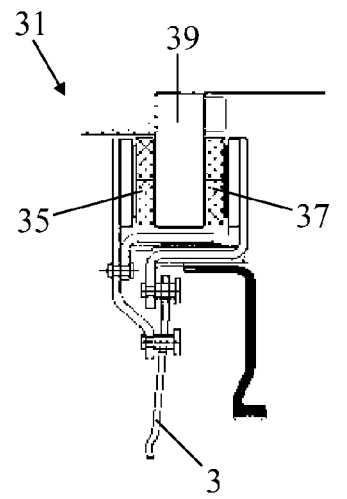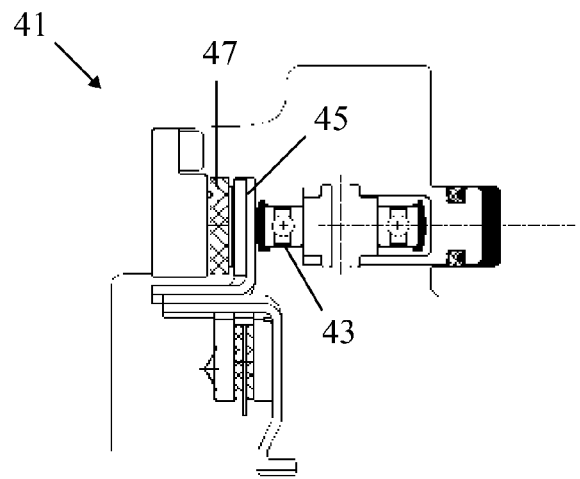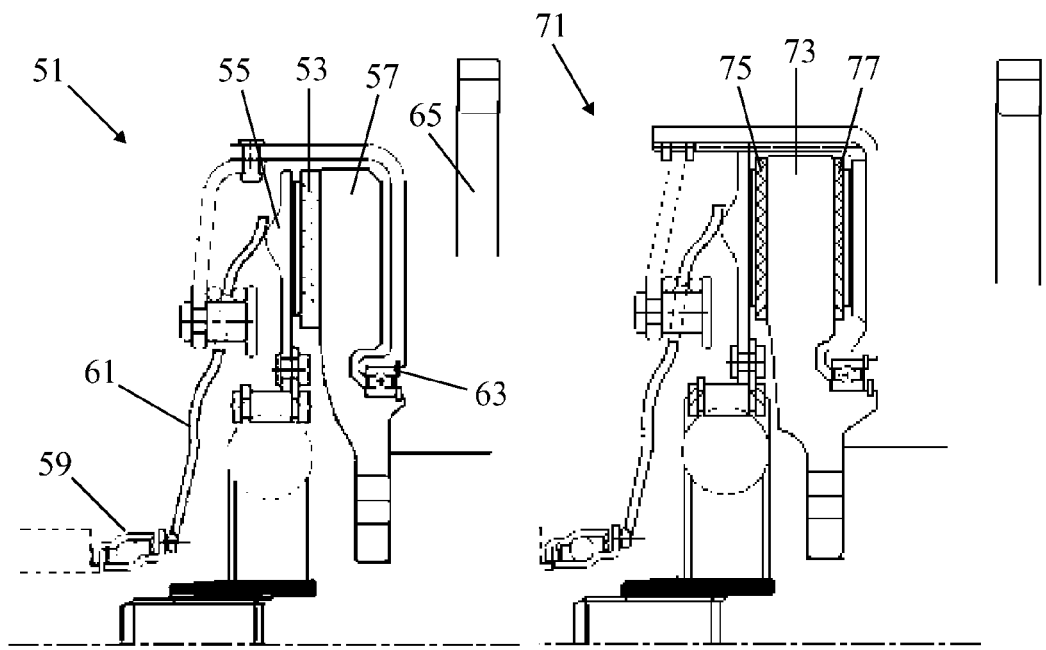
FIG. 6  FIG. 7
FIG. 8  FIG. 9

CLUTCH AND/OR BRAKE MODULE

TECHNICAL FILED OF THE INVENTION

The invention relates to a clutch and/or brake module comprising:
a heat sink, which is attached to a cooling body (for example, a flywheel, or a transmission housing) for the purpose of discharging heat;
a friction disc which is connected to a rotational member (for example, a transmission input shaft or a rotation body of a planetary gear train) which can rotate about the same axis as the friction disc, which friction disc on at least one side is provided with a lining and is faced with this side towards the heat sink; and
an actuation system with which an axial pressing force on the friction disc can be exercised, in which the friction disc is located axially between the heat sink and the actuation system.

BACKGROUND OF THE INVENTION

Such a clutch and/or brake module is generally known. In the known clutch and/or brake module the friction disc (on both sides provided with a lining) is located between two heat sinks and the pressure force is applied on one of the heat sinks. The discharge of heat of the axially movable heat sink is often the limiting factor of the performance of the brake or clutch.

SUMMARY OF THE INVENTION

It is an object of the invention to provide a clutch and/or brake module of the type described in the opening paragraph in which the heat is better discharged than in the known module, and thus the brake or clutch can meet higher requirements in respect of braking power or torque transfer. To this end, the clutch and/or brake module according to the invention is characterized in that no further heat sink, which during operation (braking/coupling) has a rotation speed difference with the friction disc, is present between the friction disc and the actuation system. Because no axially movable heat sink is present, all of the friction heat is discharged through the in the axial direction non-movable heat sink. Because the pressing force is exerted on the friction disc and not on an axially movable heat sink, it is sufficient to have only one heat sink, and non-complicated facilities can be used to discharge heat in a sufficient way. This construction is especially advantageous in case the clutch and/or brake module is equipped with a dry friction disc because in such a module the discharge of heat is more of an issue than in a wet environment.

The solid heat sink can be cooled well, because it is secured to the crankshaft or a housing part. The external cooling of an axially movable heat sink is always difficult. The axially movable heat sink in a dry plate brake or clutch is always the limiting factor for the heat capacity of the clutch or brake. With the clutch and/or brake module of the invention, the capacity can be increased with a factor of 3 due to the absence of the axially movable heat sink.

The module may be a clutch module in which the plate is a clutch plate, the cooling body is a further rotational member (for example, a transmission axis), and the disc is a clutch disc. The module can also be a brake module in which the plate is a brake plate, the cooling body is the fixed world (for example, transmission housing), and the disc is a brake disc. The module can also be a combined clutch and brake module equipped with a clutch disc and a brake disc, as well as a clutch plate and a brake plate, and a rotational member and a fixed world.

Preferably, the clutch and/or brake module further comprises a pressure plate, which is located axially between the friction disc and the actuation system, wherein the actuation system can exercise an axial pressure force on the pressure plate.

In this case the friction plate and the pressure plate are preferably fixed to one another in the direction of rotation, for example by means of a spline connection.

An embodiment of the clutch and/or brake module according to the invention is characterized in that the actuation system comprises actuation means (for example, a cylinder-piston combination, whether or not equipped with a lever), as well as an axial bearing (bearing with rolling elements, such as a ball bearing, needle roller bearing, thrust bearing, or a sliding bearing) which is present between the pressure plate and the actuation means. The actuation system can exert the axial force on the pressure plate from the fixed world. The axial bearing is preferably oil-lubricated or grease-lubricated and the dry friction material is preferably present in a dry environment, so that it does not need to be lubricated.

A further embodiment of the clutch and/or brake module according to the invention is characterized in that the clutch and/or brake module further comprises a further friction disc, which is also provided with a lining on at least one side and with this side is faced towards the heat sink, wherein the actuation system can exercise a further pressing force on the further friction disc, wherein the further friction disc is axially located between the heat sink and the actuation system and between the further friction disc and the actuation system there is no further heat sink, which during operation has a rotation speed difference with the friction disc.

In the above embodiment, the clutch and/or brake module preferably comprises a further pressure plate which is located axially between the further friction disc and the actuation means, wherein the actuation system can exercise an axial pressure force on the further pressure plate.

Yet a further embodiment of the clutch and/or brake module according to the invention is characterized in that the rotational member consists of or is connected to a first rotation body of an epicyclic gearing (e.g., a planetary gear train), wherein a second rotation body of the epicyclic gearing can be connected to a drive source and a third rotation body can be connected to wheels of a vehicle or an input shaft of a transmission, wherein the epicyclic gearing is non-lubricated or is lubricated by grease.

BRIEF DESCRIPTION OF THE DRAWINGS

The invention will be further elucidated below on the basis of drawings. These drawings show embodiments of the clutch and/or brake module according to the present invention. In the drawings:

FIG. 1 is a basic embodiment of a brake module according to the invention;

FIGS. 2 and 3 show two embodiments, in which the actuation force of an actuator is transmitted to the friction disc through an axial bearing;

FIGS. 4 and 5 show two further embodiments, in which the actuation force of the actuator is transmitted to the friction disc through an axial bearing;

FIG. 6 shows an embodiment, in which the axial force is transmitted to two friction wheels through a lever;

FIG. 7 shows an embodiment, in which by means of a roller bearing, the axial force is transmitted to the pressure plate;

FIG. 8 shows an embodiment of a clutch module according to the invention;

FIGS. 9 and 10 show embodiments of a clutch module, wherein the heat sink is located between two friction discs;

FIG. 11 shows an embodiment in which a ring gear is connected to the heat sink;

DETAILED DESCRIPTION OF THE DRAWINGS

Figures 10, 11:
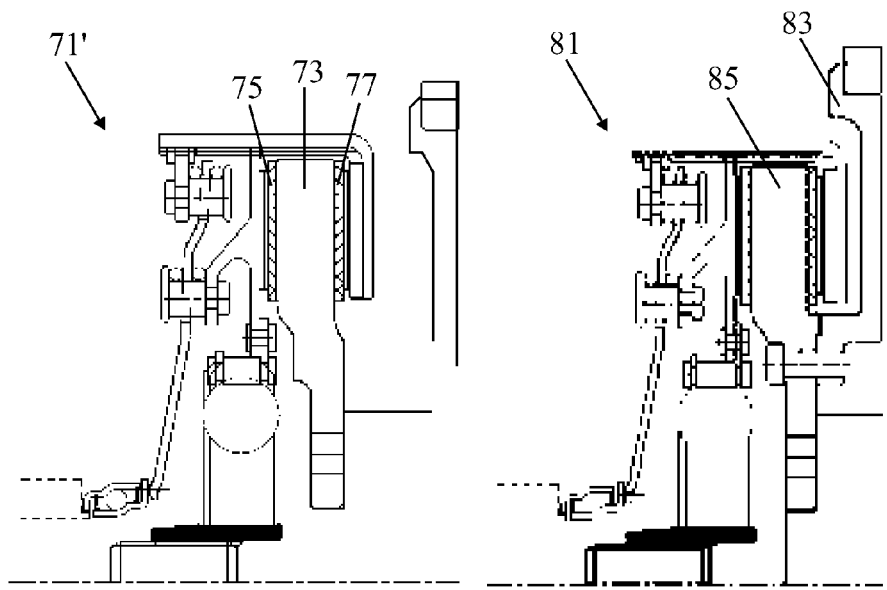

In FIG. 1 a basic embodiment of the clutch and/or brake module according to the invention is shown, which module is designed as a brake module. The brake module 1 has a heat sink 3 which is attached to a cooling body for the purpose of discharging heat. In this embodiment the cooling body is a transmission housing. The brake module further has a brake disc 5 (friction disc), which is connected to a rotational member formed by a shaft 7 (schematically indicated by a center line). The brake disc is provided on one side with a lining 9, and faces with this side towards the heat sink 3. The brake is a dry brake and is not lubricated.

The brake module further has an actuation system 11 (cylinder with piston movable therein, schematically indicated by an arrow) which can exert an axial pressing force directly on the brake disc 5. The brake disc is located axially between the heat sink and the actuation system. The heat sink 3 is secured to a transmission housing 13, a part of which is schematically shown.

FIGS. 2 and 3 show two embodiments of the brake module 1' and 1" in which the actuation force of a plunger of the actuation system 11 is transmitted to the brake disc 5 through an axial bearing 15 and through a pressure plate 17. The thrust bearing is oil lubricated or grease lubricated. The plunger can be positioned on different radii by the use of an intermediate plate 19. The actuation system is such that from the fixed world the axial force can be exerted on the pressure plate.

FIGS. 4 and 5 show two further embodiments in which the force of the actuation system is transmitted on the friction disc through an axial bearing. In the brake modules 21 and 21', a lever 23 is provided which can increase the pressure force to the brake disc. In the embodiment shown in FIG. 4 the reaction force is supported on a further thrust bearing 25 and in the embodiment shown in FIG. 5, the reaction force is supported on a second brake disc 27, which is tangentially coupled to the first disc, but is axially movable with respect to this brake disc.

FIG. 6 shows an embodiment of the brake module 31, in which the axial force on the two friction discs 35 and 37 is transmitted by means of a lever 33. In this embodiment the heat sink 39 is located between the two brake discs. The pressure plate can be activated by a compression spring, which increases the actuation force on the pressure plate.

FIG. 7 shows an embodiment of the brake module 41, in which the axial force is transferred on the pressure plate 45 through a rolling bearing 43. The axis of rotation of the rolling bearing is (substantially) at right angles to the axis of rotation of the brake disc 47.

FIG. 8 shows an embodiment of a clutch module 51 in accordance with the invention. The clutch disc 53 is connected to a pressure plate 55 and the cooling plate 57 constitutes the heat sink of the clutch. The axial force is applied to the pressure plate through a first axial bearing 59 and a lever 61. The reaction force is supported on the heat sink via a further axial bearing 63. The heat sink is attached to or is a part of an engine flywheel 65 of an internal combustion engine and is (or can be) attached to a crankshaft. The clutch is closed when not energized.

FIGS. 9 and 10 show embodiments of the clutch module 71, 71', wherein the heat sink 73 is located halfway between two friction discs 75 and 77. The friction discs are tangentially connected with each other, and can move axially relative to each other. In the embodiment shown in FIG. 9, in the non-actuated state the clutch is closed and in the embodiment shown in FIG. 10 in non-actuated state the clutch is open.

FIG. 11 shows an embodiment of the clutch module 81 in which a ring gear 83 is connected to the heat sink 85. Between the ring gear and the heat sink a one way bearing/clutch may be present (for start-stop application).

Figures 12, 13:
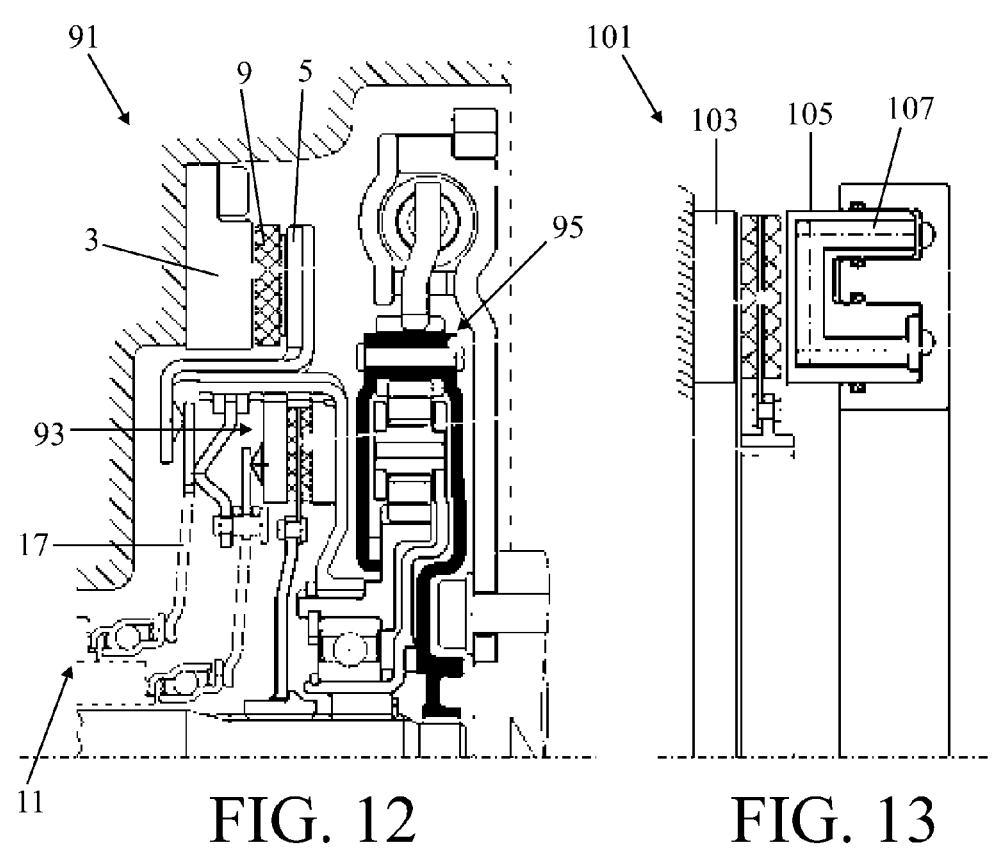
FIG. 12 shows an embodiment of a brake module according to the invention equipped with a clutch.
FIG. 13 is an alternative brake module, which is not part of the invention, with two cooling plates of which one is axially movable.

In FIG. 12 an embodiment of a brake module 91 is shown which is equipped with a clutch 93 and which is connected to a flywheel via a planetary gear set 95. The pressure plate is connected via an intermediate plate to a first rotation body of the planetary set, wherein a second rotation body of the planetary set is connected to a drive source and a third rotation body is connected to one of the wheels of a vehicle or to an input shaft of a transmission comprising at least two different ratios and being connected to one or more of the wheels of a vehicle. A clutch may be present between two rotation bodies of the epicyclic gearing. The planetary set is non-lubricated or grease lubricated.

FIG. 13 shows an alternative brake module 101, which is not part of the invention represented by the two heat sinks 103 and 105 one of which is formed by an axially movable plunger. This plunger is cooled by a cooling liquid which also during the movement of the plunger continues to flow through a cooling channel 107 present in the plunger.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims.

What is claimed is:

1. A brake module comprising:
   a heat sink, which does not rotate and is attached to a cooling body for the purpose of discharging heat, wherein the cooling body is a transmission housing or a flywheel housing;
   a friction disc which is connected to a rotational member which can rotate about a same axis as the friction disc, the friction disc on at least one side is provided with a lining and the at least one side with the lining is facing towards the heat sink;
   wherein the friction disc is dry; and
   an actuation system which can move the friction disc axially so that the lining of the friction disc is pressed against the heat sink,
   wherein no axially movable heat sink is present in the brake module.

2. The brake module according to claim 1, further comprising a pressure plate, which is located axially between the friction disc and the actuation system, wherein the actuation system can exercise an axial pressure force on the pressure plate.

3. The brake module according to claim 2, wherein a friction plate and the pressure plate are fixed to one another in a direction of rotation.

4. The brake module according claim 1, wherein the rotational member is connected to a first rotation body of an epicyclic gearing, wherein a second rotation body of the epicyclic gearing can be connected to a drive source and a third rotation body can be connected to wheels of a vehicle or an input shaft of a transmission, wherein the epicyclic gearing is non-lubricated or is lubricated by grease.

5. A brake module comprising:
- a heat sink, which does not rotate and is attached to a cooling body for the purpose of discharging heat, wherein the cooling body is a transmission housing or a flywheel housing;
- a friction disc which is connected to a rotational member which can rotate about a same axis as the friction disc, the friction disc on at least one side is provided with a lining and the at least one side with the lining is facing towards the heat sink;
- wherein the friction disc is dry; and
- an actuation system which can move the friction disc axially so that the lining of the friction disc is pressed against the heat sink,
- wherein the heat sink is the only heat sink of the brake module, through which friction heat is discharged upon actuation of the friction disc.

\* \* \* \* \*